Figure 1:
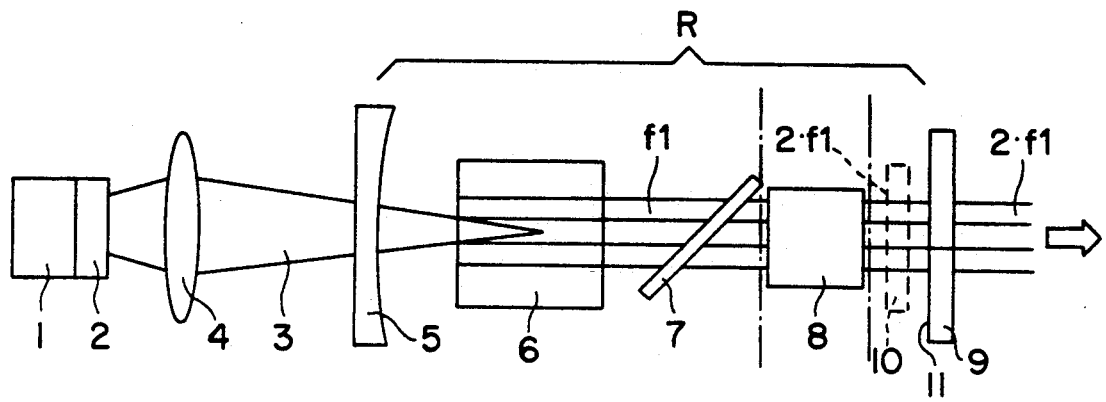

United States Patent [19]
Kortz et al.

[11] Patent Number: 5,249,190
[45] Date of Patent: Sep. 28, 1993

[54] FREQUENCY-DOUBLED LASER

[75] Inventors: Hans-Peter Kortz, Pansdorf; Dörte Wedekind, Lübeck, both of Fed. Rep. of Germany

[73] Assignee: Adlas GmbH & Co. KG, Lübeck, Fed. Rep. of Germany

[21] Appl. No.: 776,260

[22] PCT Filed: May 23, 1990

[86] PCT No.: PCT/EP90/00836
§ 371 Date: Jan. 23, 1992
§ 102(e) Date: Jan. 23, 1992

[87] PCT Pub. No.: WO90/15460
PCT Pub. Date: Dec. 13, 1990

[30] Foreign Application Priority Data

Jun. 1, 1989 [DE] Fed. Rep. of Germany ....... 3917902

[51] Int. Cl.⁵ .................................. H01S 3/10
[52] U.S. Cl. ........................... 372/22; 372/21; 372/98; 359/328
[58] Field of Search .................. 372/21, 22, 38; 359/328

[56] References Cited

U.S. PATENT DOCUMENTS

| | | | |
|---|---|---|---|
| 3,619,637 | 11/1971 | Goto | 307/88.3 |
| 4,739,507 | 4/1988 | Byer et al. | 372/22 |
| 5,030,851 | 7/1991 | Unternahrer | 372/22 |
| 5,047,668 | 9/1991 | Rosenberg | 372/21 |
| 5,084,879 | 1/1992 | Suzuki et al. | 372/22 |

FOREIGN PATENT DOCUMENTS

3643648 7/1987 Fed. Rep. of Germany .
1130582 5/1989 Japan .

OTHER PUBLICATIONS

Perkins, P. E. and Driscoll, T. A.: "Efficient Intracavity Doubling in Flash-Lamp Pumped Nd:YLF", *J. Opt. Soc. Am. B*, vol. 4, No. 8, Aug., 1987, pp. 1281–1285.

Huth, G. B. and Kuizenga, D.: "Green Light from Doubled Nd:YAG Lasers", *Lasers & Optronics*, No. 10, Oct., 1987, pp. 59–61.

Hanna, D. C., Kazer, A. and Shepherd, D. F.: "Active Mode-Locking and Q-Switching of a 1.54 μm Er: Glass Laser Pumped by a 1.064 μm Nd:YAG Laser", *Optics Communications*, vol. 65, No. 5, Mar. 1, 1988, pp. 355–357.

Burnham, R. and Hays, A. D.: "High-Power Diode-Array-Pumped Frequency-Doubled cw Nd:YAG Laser", *Optics Letters*, Optical Society of America, vol. 14, No. 1, 1989, pp. 27–29.

Weber, H.: "Laserresonatoren und Strahlqualität–Resonators and Beam Quality", *Laser und Optoelektronik*, No. 2, 1988, pp. 60–66.

Primary Examiner—Leon Scott, Jr.
Attorney, Agent, or Firm—Gottlieb, Rackman & Reisman

[57] ABSTRACT

A frequency-doubled laser contains laser diodes as a pumped light source and a resonator (R) comprising in the stated order a first mirror (5), a laser medium (6), a Brewster plate (7) as a polarizer, a nonlinear crystal (8) for frequency doubling and a plane mirror (9) as an output mirror. The plane mirror ensures that shifts of rays taking place within the nonlinear crystal remain in the radiation area even when returning through the crystal, in contrast to the prior art which uses a concave mirror as an output mirror that causes shifted rays from the nonlinear crystal to be deflected out of the beam path. The inventive measure achieves a laser light that has high efficiency and is virtually free from intensity fluctuations.

13 Claims, 1 Drawing Sheet

FREQUENCY-DOUBLED LASER

The present invention relates to a laser of the type which has a pumped light source and a resonator.

Many interesting lasers provide laser light whose wavelengths are useless, or poorly suited, for many applications. Visible laser light is required specifically for optical applications. For example, an Nd-YAG laser provides laser radiation with a wavelength of 1064 nm. Attempts have therefore been made to convert this laser light into visible light by frequency doubling.

Numerous proposals are known for how to obtain a frequency doubling of laser light. For example, a nonlinear crystal inside or outside a resonator is used. The laser light is coupled into the crystal and at the output of the crystal one obtains laser radiation with a double frequency. However, the intensity of the double-frequency light has a relatively lo ratio to the intensity of the light with the original laser frequency; this ratio depends on the intensity of the laser light with the fundamental wavelength that passes into the crystal.

In view of this fact there have been consistent attempts up to now to dispose the nonlinear crystal in a place where there is a considerable concentration of intensity. For example, DE-OS 36 43 648 proposes giving the output mirror disposed beside the nonlinear crystal a concave, partly mirror-coated surface in order to obtain an optimal beam shaping in the resonator. The concave mirror surface is intended to obtain a focusing of the radiation.

In virtually all known proposals for a frequency-doubled laser the output mirror is designed as a concave mirror in the neighborhood of the nonlinear crystal.

Nevertheless, the yield of frequency-doubled light is relatively low. There are fluctuations in intensity which have a particularly serious effect in the continuous wave mode. High intensity Peaks can be observed.

There are a number of theoretical and practical investigations on the causes for such intensity fluctuations and how to eliminate them.

However, these efforts to eliminate the intensity fluctuations totally or at least in part have had no decisive success up to now.

The invention is based on the problem of providing a laser of the type stated at the outset that shows only small intensity fluctuations in the frequency-doubled radiation while having high efficiency.

This problem is solved by the present invention which fundamentally involves two alternative possibilities. Firstly, it is regarded as imperative to fix a clear polarization of the fundamental wave in the resonator with the aid of a polarizer since this is a precondition for stable operation. The polarizer is disposed between the nonlinear crystal and the laser medium.

In a first embodiment of the invention the output mirror is designed as a plane mirror or an approximately plane mirror. The invention thus expressly departs from the concave output mirror that has hitherto been regarded as virtually imperative in the expert world. While the arrangement of the nonlinear crystal in the area of the focus of the concave output mirror used to be regarded as virtually imperative, the design of the laser according to the present invention dispenser with the maximum light intensity in the center of the nonlinear crystal. However, this is more than compensated for by a gain that is due to the avoidance of an undesirable shift of rays within the nonlinear crystal. This is explained in more detail in the following.

Light passing into the nonlinear crystal is generally divided, as is well-known, into two extraordinary rays which are polarized perpendicular to each other. In the special case of uniaxial crystals these are the well-known ordinary and extraordinary component rays. With the type II frequency doubling treated here the intensities of the two rays are about equal since the polarizer preceding the crystal polarizes the light in a direction that forms an angle of 45° with the two polarizing directions. The two rays obey different laws of calculation and are deflected laterally relative to each other, emerging from the crystal in staggered arrangement. When these rays hit the concave mirror only one of the two can be reflected back into itself while the other is deflected to the side so that considerable useful radiation capacity is lost. The inventive measure of employing a plane mirror as an output mirror prevents a loss of beam intensity, in contrast to the use of a concave mirror.

However, the inventive measure does not rule out the use of other focusing means. For example, in accordance with the prior art the first mirror before the laser medium can be formed as a concave mirror with respect to, i.e., facing the resonator.

In an alternative embodiment of the invention, which permits any curved output mirrors but expressly includes the possibility of a plane mirror as an output mirror, one can avoid the shifts of rays explained above by disposing two nonlinear crystals one behind the other, staggering these crystals by 90° about the secondary optical axis. This measure causes the second crystal to compensate the shift of rays taking place within the first crystal due to the component rays extending differently within the crystals.

The fact that the extraordinary ray is prevented from exiting laterally from the optical axis virtually eliminates losses and also avoids a cause for oscillation in higher transverse modes.

The invention can fundamentally be used in virtually all types of lasers, but it is particularly suitable in conjunction with solid state lasers. Furthermore, a laser diode or a field of laser diodes is preferably used as a pumped light source.

To permit laser light with a single frequency, namely a frequency corresponding to twice the basic laser frequency, to be available if possible as a useful frequency-doubled radiation, the output mirror of the resonator should have a higher permeability for the frequency-doubled radiation than for the basic laser frequency. Ideally, the output mirror should be virtually impermeable for the basic frequency of the laser.

Figure 2:
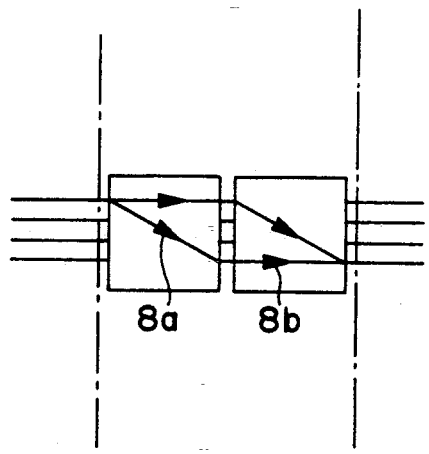

In the following some embodiment examples of the invention are explained in more detail with reference to the drawing, in which FIG. 1 shows a schematic side view of a laser with frequency doubling, and FIG. 2 shows a schematic sketch of an alternative embodiment for a nonlinear crystal as a frequency-doubling element.

A pumping means 1 provides light 3 to a lens 4 via a laser diode 2. Lens 4 couples light 3 serving as pumped light into a resonator R.

The resonator is bounded on the left side in FIG. 1 by a concave mirror 5. This is followed in the shown order by a laser medium 6, a Brewster plate 7 serving as a polarizer, a KTP as a nonlinear crystal 8, optionally a λ/4 plate 10, and a plane mirror 9 serving as an output mirror, with a plane mirror surface 11 facing the laser space.

Pumped light 3 produces in laser medium 6 a laser radiation with frequency f1. This light is polarized by Brewster plate 7 so that linearly polarized light passes into the KTP where the rays are divided into two extraordinary component rays. The light emerging on the other side of KTP 8 has frequency 2 X f1. This frequency-doubled laser light is coupled out via output mirror 10 and exits on the right side in FIG. 1.

Laser medium 6 is a doped crystal, for example Nd:YAG. The nonlinear crystal here is KTP. However, other known nonlinear crystals can also be used instead, for example KTA, KDP, BBO, LiNBO$_3$, KNbO$_3$, BaNaNbO$_3$, LiIO$_3$, etc.

In a modified embodiment, KTP 8 shown in FIG. 1 can be replaced by the two nonlinear crystals 8a and 8b shown in FIG. 2, which are staggered by 90° relative to the secondary optical axis of the laser light. The shifts in individual crystals 8a, 8b thus compensate each other, as indicated by individual arrows for the one direction in which the laser beams pass. In this embodiment, output mirror 9 is preferably likewise designed as a plane mirror, but it can also be designed as a concave mirror in the known way.

We claim:

1. A laser having a pumped light source and a resonator, which resonator has an optical axis and includes, arranged in series with respect to each other along said optical axis, a first mirror, a laser medium, a polarizer, a nonlinear crystal structure for type II frequency doubling, and a second mirror serving as an output mirrors; wherein the improvement comprises that:
   (a) said second mirror has a mirror surface which faces toward said nonlinear crystal structured and is place or approximately plane,
   (b) said nonlinear crystal structure serves to split light passing through said resonator into two mutually offset rays which have repetitive polarization directions perpendicular to each other, and
   (c) said polarizer is constructed and arranged to polarize said light in a polarization direction forming an angle of 45° with respect to said polarization directions of said rays provided by said nonlinear crystal structure with an extremely large radius of curvature, being preferably designed as a plane mirror, and/or two nonlinear crystal (8a, 8b) are provided which are staggered by 90° relative to the secondary optical axis.

2. A laser having a pumped light source and a resonator, which resonator has an optical axis and includes, arranged in series with respect to each other along said optical axis, a first mirror, a laser medium, a polarizer, a nonlinear crystal stricture for type II frequency doubling, and a seconded mirror serving as an output mirror; wherein the improvement comprises that:
   (a) said nonlinear crystal structure comprises first and second nonlinear crystals which are staggered relative to each other by 90° about said optical axis, with said first nonlinear crystal serving to split light passing through said resonator into two mutually offset rays which have respective polarization directions perpendicular to each other, and with said seconded nonlinear crystal serving to recombine said two rays into a single ray; and
   (b) said polarizer is constructed and arranged to polarize said light in a polarization direction that forms an angle of 45° with respect to said polarization directions of said rays.

3. The laser of claim 1 or 2 wherein said laser medium is a solid body.

4. The laser of claim 3, wherein said solid body is a doped crystal.

5. The laser of claim 1 or 2, wherein said second mirror is mounted on a surface of said nonlinear crystal structured which faces away from said laser medium.

6. The laser of claim 5, wherein said second mirror is constituted by a mirror coating formed on said surface of said nonlinear crystal structure, and said first mirror is constituted by a mirror coating on a surface of said laser medium which faces toward said pumped light source.

7. The laser of claim 6, wherein said pumped light source comprises one or more laser diodes.

8. The laser of claim 6, wherein said second mirror has a higher permeability for the frequency-doubled radiation exiting from said nonlinear crystal structure than for the basic laser frequency.

9. The laser of claim 5, wherein said pumped light source comprises one or more laser diodes.

10. The laser of claim 5, wherein said second mirror has a higher permeability for the frequency-doubled radiation exiting from said nonlinear crystal structured than for the basic laser frequency.

11. The laser of claim 1 or 2, wherein said pumped light source comprises one or more laser diodes.

12. The laser of claim 11, wherein said second mirror has a higher permeability for the frequency-doubled radiation exiting from said nonlinear crystal structure than for the basic laser frequency.

13. The laser of claim 1 or 2, wherein said second mirror has a higher permeability for the frequency-doubled radiation exiting from said nonlinear crystal structure than for the basic laser frequency.

* * * * *